Nov. 20, 1956
I. PAGE
2,771,536
AUTOMATIC PRESSURE COOKER AND ELECTRIC HEATER
Filed May 22, 1948
2 Sheets-Sheet 1
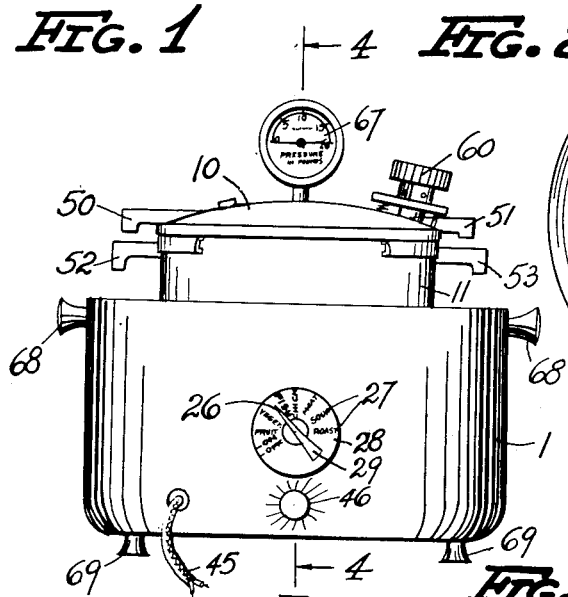
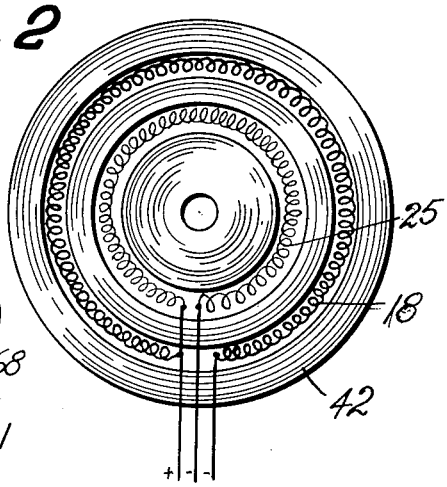
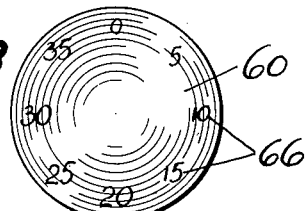
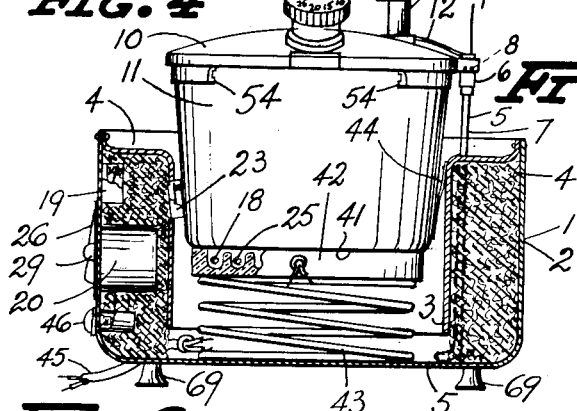
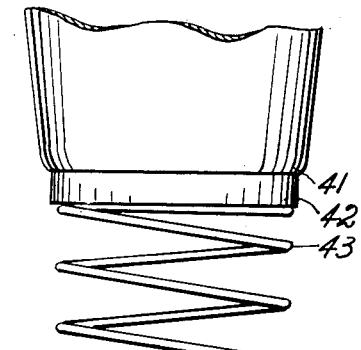
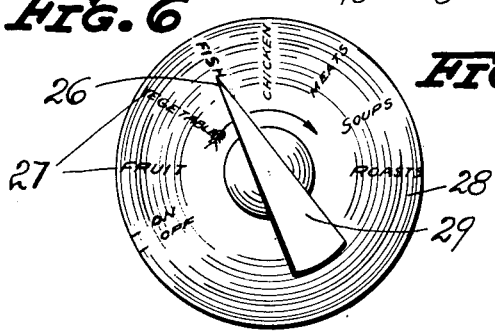
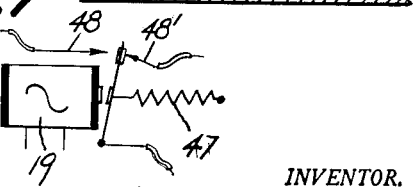
INVENTOR.
IRVING PAGE
BY Paul A. Talbot.
ATTORNEY Nov. 20, 1956   I. PAGE   2,771,536
AUTOMATIC PRESSURE COOKER AND ELECTRIC HEATER
Filed May 22, 1948   2 Sheets-Sheet 2
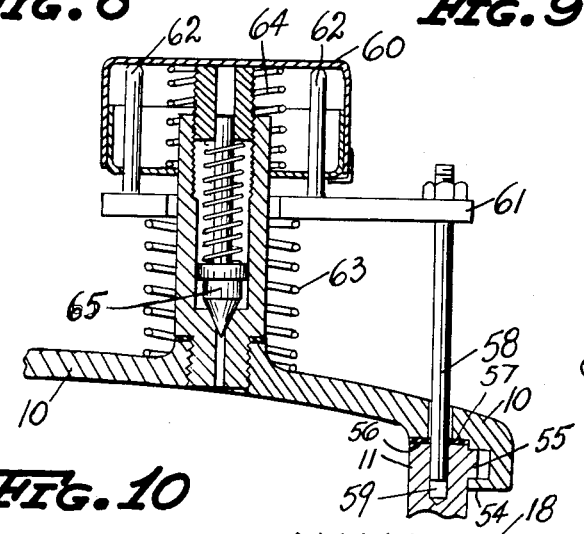
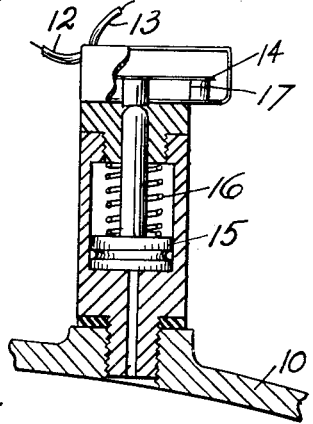
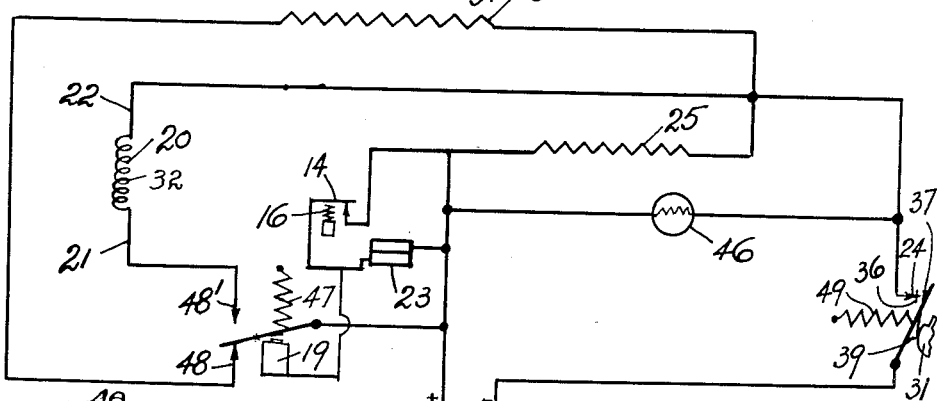
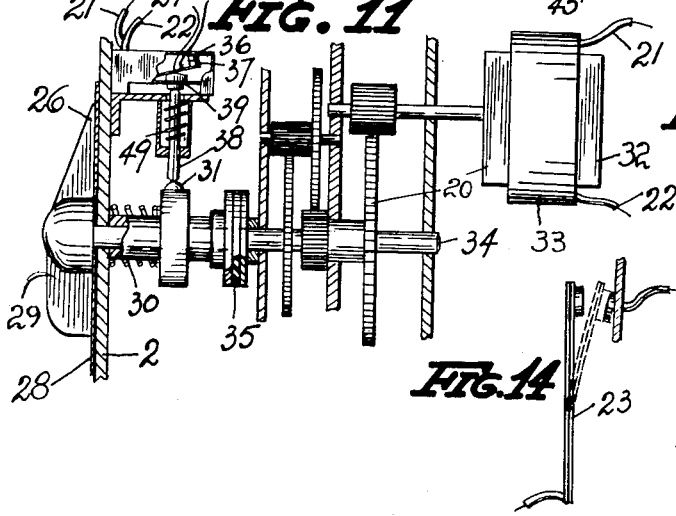
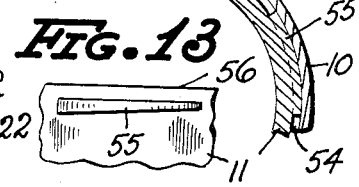
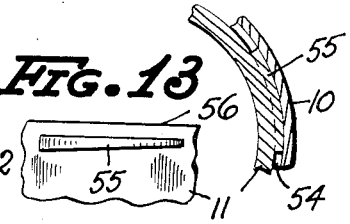
INVENTOR.
IRVING PAGE
BY Paul A. Talbot
ATTORNEY

United States Patent Office 2,771,536
Patented Nov. 20, 1956

2,771,536

AUTOMATIC PRESSURE COOKER AND ELECTRIC HEATER

Irving Page, New York, N. Y.

Application May 22, 1948, Serial No. 28,627

1 Claim. (Cl. 219—43)

My invention relates to a pressure cooker and an electric heater automatically controlled by pressure to shut one of a plurality of heating elements off and to control other heating elements by time means.

Among the purposes and objects of my invention is to provide a combination of pressure or heat with time control means for controlling the heating elements of a cooker.

Another object is to provide a removable pressure cooker with a heater pot controlled by the pressure in the pressure cooker.

An object is to provide a cover for a pressure cooker which is locked against removal until all pressure within the cooker has been reduced to the pressure of the atmosphere.

An object is to provide a time operated heater which maintains heat in the pressure cooker for a predetermined period after the main heater has been shut off.

Still another object is to provide electric control means which cooperates first with pressure operated means then with time control means in sequence.

An object is to provide detachable electric connections between the heater pot and the removable pressure cooker for automatically connecting the cover of the cooker with the heater pot.

An object is to provide a spring supported heating plate in the heater pot to press the heater plate against the bottom of a removable pressure cooker when inserted into the pot.

An object is to provide a heater pot having time operated electric control means, signal, heating elements, a relay and electric pressure control connections.

I accomplish these and other objects by the construction herein described and shown in the drawings which form a part of this, my disclosure.

In the drawings:

Fig. 1 is an elevational view showing my heater and cooker.

Fig. 2 is a top plan view of the heating plate.

Fig. 3 is a plan view of the pressure regulating knob or cap.

Fig. 4 is a section of the pot and heater at 4—4, Fig. 1.

Fig. 5 is a fragmentary detail showing the heating plate and spring.

Fig. 6 is an elevational view of the heat control dial and pointer.

Fig. 7 is a detail of the relay.

Fig. 8 is a vertical section of the pressure regulator and cover lock.

Fig. 9 is a vertical section of the pressure operated switch.

Fig. 10 is a wiring diagram.

Fig. 11 is a detail of the time control mechanism.

Figs. 12 and 13 are details of the cover locking inclined lugs.

Fig. 14 is a detail of the thermostatic switch.

Similar reference characters refer to similar parts throughout the several views of the drawings and in the specifications.

Electrically heated pressure cookers and electric heating pots for fireless cookers are well known and need not be compared with my invention except to illustrate the improvements. My Patent No. 2,431,582 and co-pending application, Serial No. 618,850, now U. S. Patent 2,537,695 granted January 9, 1951, are of particular interest.

The control means for automatically cooking various foods having various time periods to completely finish the cooking period is herein disclosed. The improved cooking pot and pressure cooker which is heated and kept hot after the desired pressure and temperature have been reached by the pot are parts of my invention all of the parts of which cooperate to produce the result of automatic cooking.

Fruits, tender vegetables and some frozen foods are found to be fully cooked after bringing the pressure up to ten pounds or twelve pounds per square inch (240 degrees F. to 244 degrees F.) within the cooker and then maintaining the temperature for a period of one minute for fruit to five minutes for vegetables. The maintenance period for other foods is found to be as follows:

| | Minutes |
|---|---|
| Fruit | 1 |
| Vegetables | 7 |
| Fish | 12 |
| Fowl | 20 |
| Soups | 22 |
| Meat | 25 |

The time period, or maintenance, after bringing the cooker up to twelve pounds pressure, is seldom more than thirty minutes for any food. Foods requiring long, slow cooking periods may be left in the cooker and both within the pot which surrounds the cooker and is well insulated.

A large and small electric heating element is provided. The large element, or both elements, are first turned on until the desired pressure is reached then a pressure operated cut out and relay shuts off the large heater and then a time controlled device similar to a clock which is set for the particular food being cooked maintains the heat for the period required before cutting off the small heating element to thus complete the cooking period. The indicia on the time device states the food instead of the time in minutes so that, for instance, if fowl is being cooked the time device is set for fowl which automatically cooks the fowl.

I have not attempted to show all possible modifications which may be made without departing from the principles which underly my invention but rather have shown and described in detail a preferred embodiment of my invention so that one skilled in the art to which this invention pertains may more easily understand the construction. Modifications may suggest themselves after a sudy of this, my disclosure.

The preciseness of the detailed description and the preciseness of the drawings is not intended to limit the scope of my invention which is set forth in the appended claim.

Referring to the drawings I have shown a heating pot or device 1 comprising an outer housing 2 spaced apart from an inner liner 3 connected at the top by the outward flange or table 4 through which the electrical connections 5 are carried and secured to the terminals 6 which are secured to and supported by the stand 7 to engage the mating connector terminals 8 in the bracket 9 on the cover 10 of the container or cooker 11. The terminals 8 are connected to the wires 12 and 13 of the pressure switch 14 which comprises a piston 15 which overcomes the spring 16 to move the contact point 17 to shut off current from the larger heating element 18 by operating the relay 19 and its switch which energizes the time device 20 through the wires 21 and 22 after shutting the large element 18 off.

The thermostat 23, in like manner, operates the relay 19 when the temperature has reached 240 degrees F., the temperature of steam at ten pounds pressure, to operate the relay 19 to shut the current off from the large element 18 and to simultaneously connect the time device 20.

The thermostat 23 or the pressure switch may both be used or either one separately may be used to operate the relay.

The time device is provided with the switch 24 which turns the large element 18 on together with the small heating element 25. The large element may be 900 watts and the small element 100 watts; 1000 watts being used to heat the cooker until ten pounds pressure or the equivalent heat of 240 degrees F., is attained at which time the large element is shut off and the small element only remains on to maintain the heat in the cooker until the time device shuts it off as predetermined by the setting of the time device by moving the indicator pointer 26 from On to any one of the designations 27 such as; Fruit, Vegetables, Fish, Chicken, Soup or Roast or other indicia on the dial 28.

The indicator pointer 26 and regulating knob 29 are mounted on the shaft 30 to which is secured the cam 31 adapted to break the electric circuit in the wire 21 which connects the coil 32 of the synchronous motor 33 which imparts motion to the time operated shaft 34 and to the friction member 35 which moves the shaft 30 and cam 31 to close the circuit and connect the points 36 and 37 of the switch 24 by the cam follower 38 and operator 39 and to release the points which are moved by the spring 40 to break the circuit after the time for cooking has elapsed.

The friction member 35 permits the pointer 26 and cam 31 to be moved independent of the movement imparted by the motor 33 to any desired setting or to a fraction of the time required to make one complete revolution of shaft 34 so that the circuit to the small heating element is shut off at the desired time for cooking fish, for instance, or for the longer period such as the time required for cooking a roast.

Heat is applied to the bottom 41 of the cooker 11 by the large and small elements 18 and 25 which are mounted in the plate 42 which is pressed against the bottom by the spring 43.

The thermostat 23 is pressed against the lower part of the cooker by the springs 44 which hold the cooker firmly in the pot while in use.

The electric circuits may be followed by referring particularly to the wiring diagram shown in Fig. 10 of the drawings.

Current is supplied to my cooker from its source through the plug in cord 45 and is turned on by placing the pointer at On on the dial 28 which closes the circuit through the switch 24 which turns on the signal light 46 and the heating elements 18 and 25 and energizes the relay 19. The pressure switch 14 and thermostat 23 upon reaching the pressure of ten pounds or 140 degrees F. temperature, break the circuit to the relay; the spring 47 thereof opens the switch 48 and simultaneously closes the switch 48' thereby energizing the time device 20 which rotates the cam 31 until the operator 39 releases the spring 49 which separates the points 36 and 37 of the switch 24 which shuts off the small heating element 25 and the signal 46 which shows that the cycle has been completed and the food cooked.

A new cycle is begun when the switch 24 is turned on by moving the pointer to On which causes the cam 31 to overcome the spring 49 and the cam to move the operator 39 to close the points 36 and 37 of the switch 24.

I have provided the diametrically opposed handles 50 and 51 on the cover 10 and the diametrically opposed handles 52 and 53 on the cooker 11 to facilitate rotation of the cover in relation to the cooker which causes the inclined lugs on the cover to engage and slide on the inclined lugs 55 on the upper periphery of the cooker to force the cover to tightly engage the top edge 56 or gasket 57 of the cooker to form a pressure tight joint.

The cover is locked to prevent rotation in relation to the cooker by the movable pin 58, as shown in Fig. 8, which is forced into a conforming aperture 59 in the top edge of the cooker by the pressure adjusting cap 60 which presses the bar 61 and upwardly projecting pins 62 to overcome the spring 63 and to force the pin 58 into the aperture 59. The cover thus can be removed only when the pin 58 is raised by unscrewing the adjusting cap 60 which also presses the spring 64 against the relief valve 65 to set the valve for ten pounds pressure, or other pressure, as designated by the indicia 66 on the cap 60 and as shown by the pressure gauge 67.

The heating device or pot 1 is preferably provided with handles 68 and feet 69.

The sizes and materials used for the various parts may vary to best adapt them for the conditions of operation and uses for which my device may be adapted.

Having thus described a preferred embodiment of my invention what I claim as new and desire to secure by Letters Patent is set forth in the following claim.

I claim:

In a pressure cooker having a heating pot into which it rests and an electric heater, a removable pressure tight cover having electric control means secured thereto, wires and contact terminals secured to said cover, connected to said electric control means and said heater removable with said cover, a stand secured to said cooker having contact terminals disposed vertically in its top for breaking the circuit to said control means and for mating with said terminals secured to said cover and for supplying electric current to said control means, said contact terminals being electrically disconnected and separable by raising said cooker from said heating pot and by raising said cover, as when removed from said cooker.

References Cited in the file of this patent

UNITED STATES PATENTS

| Number | Name | Date |
|---|---|---|
| 1,157,731 | Sprenger | Oct. 26, 1915 |
| 1,361,946 | Whitaker | Dec. 14, 1920 |
| 1,418,530 | Burnham | June 6, 1922 |
| 1,473,408 | Richardson et al. | Nov. 6, 1923 |
| 1,521,093 | Hall | Dec. 30, 1924 |
| 1,689,211 | Peterson | Nov. 30, 1928 |
| 1,702,480 | Newsom | Feb. 19, 1929 |
| 1,704,270 | Wells | Mar. 5, 1929 |
| 1,821,726 | Saporta | Sept. 1, 1931 |
| 1,931,190 | Goughnour | Oct. 17, 1933 |
| 1,956,067 | Herz | Apr. 24, 1934 |
| 1,956,267 | Blakesley | Apr. 24, 1934 |
| 1,981,765 | Weiss | Nov. 20, 1934 |
| 2,054,857 | Gorsline | Sept. 22, 1936 |
| 2,152,122 | Wilcox | Mar. 28, 1939 |
| 2,179,939 | Leibow | Nov. 14, 1939 |
| 2,194,117 | Graham | Mar. 19, 1940 |
| 2,203,348 | Chambers | June 4, 1940 |
| 2,308,603 | Graham | Jan. 19, 1943 |
| 2,357,634 | Crites | Sept. 5, 1944 |
| 2,369,932 | Allen | Feb. 20, 1945 |
| 2,392,077 | Wilson | Jan. 1, 1946 |
| 2,422,974 | Newell | June 24, 1947 |
| 2,430,196 | Vaughan | Nov. 4, 1947 |
| 2,436,566 | Goldberg | Feb. 24, 1948 |
| 2,440,128 | Sullivan | Apr. 20, 1948 |
| 2,472,451 | Whitney | June 7, 1949 |
| 2,483,628 | Davis | Oct. 4, 1949 |
| 2,491,144 | Yankovitch | Dec. 13, 1949 |
| 2,515,879 | Korn | July 18, 1950 |
| 2,528,579 | Clark | Nov. 7, 1950 |

FOREIGN PATENTS

| Number | Country | Date |
|---|---|---|
| 302,787 | Great Britain | Dec. 27, 1928 |
| 374,860 | Great Britain | June 7, 1932 |